US008756601B2

(12) United States Patent
Plondke et al.

(10) Patent No.: US 8,756,601 B2
(45) Date of Patent: Jun. 17, 2014

(54) MEMORY COHERENCY ACCELERATION VIA VIRTUAL MACHINE MIGRATION

(75) Inventors: Erich J. Plondke, Austin, TX (US); Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 13/241,407

(22) Filed: Sep. 23, 2011

(65) Prior Publication Data

US 2013/0081013 A1    Mar. 28, 2013

(51) Int. Cl.
G06F 9/455    (2006.01)
G06F 9/46    (2006.01)
G06F 15/173    (2006.01)

(52) U.S. Cl.
USPC ............... 718/1; 718/104; 718/105; 709/223; 709/224; 709/225; 709/226

(58) Field of Classification Search
None
See application file for complete search history.

(56) References Cited

U.S. PATENT DOCUMENTS

| 7,203,944 | B1 |   | 4/2007  | van Rietschote et al. |
| 7,577,722 | B1 | * | 8/2009  | Khandekar et al. ............ 709/220 |
| 8,175,863 | B1 | * | 5/2012  | Ostermeyer et al. ............ 703/22 |
| 2005/0160413 | A1 |   | 7/2005  | Broussard et al. |
| 2006/0236073 | A1 | * | 10/2006 | Soules et al. .................. 711/216 |
| 2008/0222638 | A1 |   | 9/2008  | Beaty et al. |
| 2009/0228589 | A1 |   | 9/2009  | Korupolu |
| 2009/0282404 | A1 | * | 11/2009 | Khandekar et al. ............... 718/1 |
| 2009/0300614 | A1 |   | 12/2009 | Shimogawa |
| 2010/0005465 | A1 |   | 1/2010  | Kawato |
| 2010/0027420 | A1 | * | 2/2010  | Smith ............................ 370/235 |
| 2010/0050172 | A1 | * | 2/2010  | Ferris ................................ 718/1 |
| 2010/0191845 | A1 | * | 7/2010  | Ginzton ......................... 709/224 |
| 2011/0029973 | A1 | * | 2/2011  | Hara et al. ......................... 718/1 |
| 2011/0119670 | A1 | * | 5/2011  | Sugumar et al. .................. 718/1 |
| 2011/0145545 | A1 |   | 6/2011  | Hunter et al. |
| 2011/0154318 | A1 | * | 6/2011  | Oshins et al. ..................... 718/1 |
| 2011/0154331 | A1 | * | 6/2011  | Ciano et al. ....................... 718/1 |
| 2011/0197039 | A1 | * | 8/2011  | Green et al. .................. 711/162 |
| 2012/0151159 | A1 | * | 6/2012  | Muralimanohar et al. ... 711/154 |
| 2012/0151490 | A1 | * | 6/2012  | Zhang et al. .................. 718/102 |
| 2012/0233608 | A1 | * | 9/2012  | Toeroe ............................. 718/1 |
| 2012/0278530 | A1 | * | 11/2012 | Ebsen ........................... 711/103 |
| 2012/0297307 | A1 | * | 11/2012 | Rider et al. .................... 715/736 |
| 2013/0014103 | A1 | * | 1/2013  | Reuther et al. ..................... 718/1 |

FOREIGN PATENT DOCUMENTS

EP    0848330 A2    6/1998

OTHER PUBLICATIONS

International Search Report and Written Opinion—PCT/US2012/056957—ISA/EPO—Feb. 25, 2013.

(Continued)

Primary Examiner — Emerson Puente
Assistant Examiner — Adam Lee
(74) Attorney, Agent, or Firm — Peter Michael Kamarchik; Nicholas J. Pauley; Joseph Agusta

(57) ABSTRACT

A system and method for memory coherency acceleration via virtual machine migration comprises a plurality of processors. A first processor of the plurality of processors is configured to implement at least one virtual machine. A monitor is configured to monitor a number of memory requests between the first processor and at least a second processor of the plurality of processors. A virtual machine manager is configured to migrate at least a portion of the virtual machine from the first processor to the second processor based on the number of memory requests exceeding a threshold.

26 Claims, 5 Drawing Sheets

(56) References Cited

OTHER PUBLICATIONS

Michaud P "Exploiting the Cache Capacity of a Single-Chip Multi-Core Processor with Execution Migration", High Performance Computer Architecture 2004. HPCA-10. Proceedings. 10 th International Symposium on Madrid, Spain Feb. 14-18, 2004, Piscataway, NJ, USA,IEEE, Feb. 14, 2004, pp. 186-186, XP010778840.

* cited by examiner

MEMORY COHERENCY ACCELERATION VIA VIRTUAL MACHINE MIGRATION

FIELD OF DISCLOSURE

Disclosed embodiments are directed to accelerating memory coherency operations in multi-core processing systems. More particularly, exemplary embodiments are directed to virtual machine migration techniques in multi-core processing systems.

BACKGROUND

Multi-core processing systems may be composed of two or more processors/processor cores capable of operating independently. The multiple processors may be integrated in a single chip. Each processor may have its dedicated memory, while also having access to a shared memory that is shared with other processors. Network interfaces and system bus architectures enable the flow of data between the processors and shared memory structures. A multi-core processing system may also comprise two or more processing environments, wherein each processing environment may include one or more processors and shared memory structures, and the two or more processing environments may be connected through a network.

The processors within the multi-core processing environment may sometimes wish to store data in a local dedicated memory or cache, while also desiring access to the shared memory at other times. However, the multiple processors often wish to appear to users and certain programs as if they are all accessing a unified shared memory. Accordingly, in order to maintain a consistent image of the shared memory, complex cache and memory coherency techniques have been explored in the art. Sometimes cache coherency can be achieved by specialized hardware solutions. In the case of multiple processing environments coupled to a network, distributed shared memory techniques are employed to achieve coherency. The above coherency techniques conventionally involve the migration of blocks of memory from one processing environment to another.

Further, each processor may employ one or more virtual machines. A virtual machine is an abstraction of a processing environment. These virtual machines may be implemented partially or completely in software. There are many applications of virtual machines. For example, a virtual machine may be used to run a software application on a host processor, or to create a virtual environment for running user level programs. Virtual machines are also commonly employed by host processors to run an operating system that is different from the host processor's operating system, or execute an instruction set that is different from that of the host environment. Additionally, virtual machines are used to multiplex many complete processing environments in a single physical machine. Due to the nature of their operation and use, virtual machines are conventionally separated from the physical resources they use, in that they may be dynamically reassigned to a different host or the physical resources within a host may be reassigned between one of several virtual machines running on the host.

In order to maintain cache and memory coherency, the virtual machines may often request data transfers from shared memory residing in processing environments that are separate from the host processor. For example a virtual machine belonging to a host processor in a first processing environment may request data from a shared memory residing in a second processing environment, which results in the movement of large amounts of data across shared network and system bus resources. Moreover, data transfers between processing environments may only be supported in certain minimum transfer sizes. Such minimum transfer sizes may be much larger than the size of data transfer that is required by the virtual machine in the above example. As a result, in multi-core environments with processors supporting a large number of virtual machines, this problem of large blocks of memory being frequently transported on shared system resources can effectively choke the network interfaces and system buses.

The above problem is even more pronounced when it is taken into consideration that the size of the virtual machines themselves are often much smaller than the size of the data transfers initiated by the virtual machines. Accordingly, there is a need in the art for techniques which improve memory coherency while not sacrificing system resources to large data transfers caused by virtual machines.

SUMMARY

Exemplary embodiments of the invention are directed to systems and method of virtual machine migration for accelerating memory coherency operations in multi-core processing systems.

For example, an exemplary embodiment is directed to system for virtual machine migration comprising a plurality of processors. A first processor of the plurality of processors is configured to implement at least one virtual machine. A monitor is configured to monitor a number of memory requests between the first processor and at least a second processor of the plurality of processors. A virtual machine manager is configured to migrate at least a portion of the virtual machine from the first processor to the second processor based on the number of memory requests exceeding a threshold.

Another exemplary embodiment is directed to a method of managing virtual machines in a multi-core processing environment comprising a plurality of processors, wherein the method comprising implementing at least one virtual machine in a first processor of the plurality of processors. The method further comprises monitoring a number of memory requests between the first processor and at least a second processor of the plurality of processors, and migrating at least a portion of the virtual machine from the first processor to the second processor based on the number of memory requests exceeding a threshold.

Yet another exemplary embodiment is directed to system for managing virtual machines in a multi-core processing environment comprising a plurality of processors, the system comprising at least one virtual machine means implemented in a first processor of the plurality of processors. The system includes means for monitoring a number of memory requests between the first processor and at least a second processor of the plurality of processors, and means migrating at least a portion of the virtual machine means from the first processor to the second processor based on the number of memory requests exceeding a threshold.

Another exemplary embodiment is directed to non-transitory computer-readable storage medium, comprising code, which when executed by a managing processor of a plurality of processors, causes migration of a virtual machine from a first processor to a second processor of the plurality of processors, wherein the non-transitory computer-readable storage medium comprises code for monitoring a number of memory requests between the first processor and the second processor, and code for migrating at least a portion of the virtual machine from the first processor to the second processor based on the number of memory requests exceeding a threshold.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
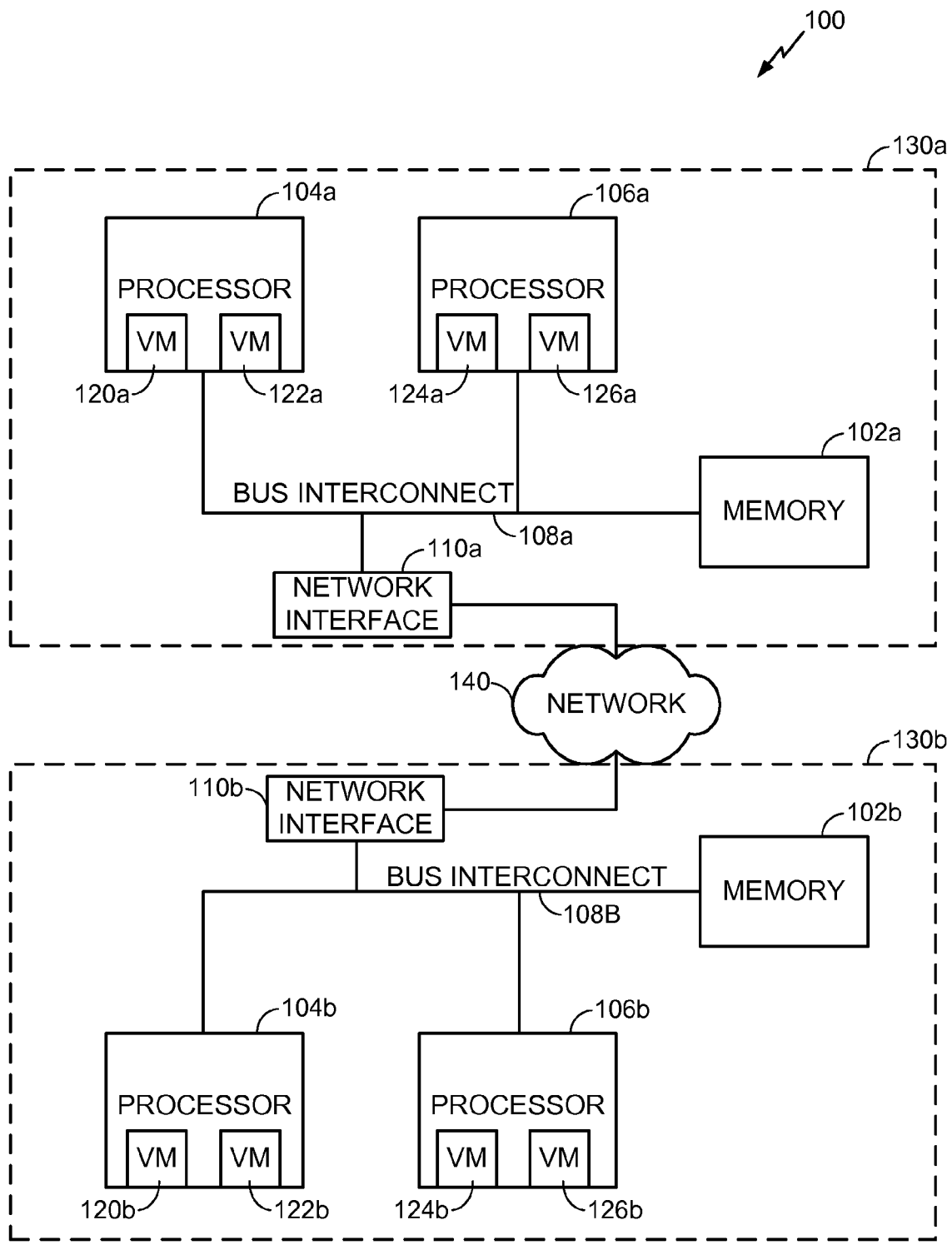
FIG. 1 is a conceptual block diagram illustrating an implementation of multi-core processing system 100 according to conventional techniques.

FIG. 1 is a conceptual block diagram illustrating an implementation of multi-core processing system 100 according to conventional techniques. System 100 may be a stand-alone system or coupled to one or more processing systems through a network. System 100 may be implemented as an integrated circuit, or distributed across multiple integrated circuits. Suitable implementations of system 100 may be embedded in a device, such as a wireless device, a desktop computer, a laptop computer, a modem or any other device requiring the processing capability of system 100. Skilled persons will recognize the best possible implementation of system 100 for particular applications.

The multi-core processing system 100 is shown with two conceptual processing environments 130$a$ and 130$b$ in communication with each other through network 140. Based on the implementation of system 100, network 140 may be any suitable communication network such as a local area network (LAN), wide area network (WAN), Ethernet, wireless LAN, optical fiber, etc.

Each processing environment, 130$a$ and 130$b$, is shown with one or more processors, shared memory systems, network interfaces and virtual machines implemented within the processors. For example, processing environment 130$a$ comprises processors 104$a$ and 106$a$. Processors 104$a$ and 106$a$ are shown as implementing virtual machines 120$a$, 122$a$, 124$a$ and 126$a$ as shown. Memory 102$a$ is shared between processors 104$a$ and 106$a$ through bus interconnect 108$a$. Bus interconnect 108$a$ also connects processors 104$a$, 106$a$ and memory 102$a$ to network interface 110$a$. Network interface 110$a$ interfaces with network 140 and acts as a means for connecting processing environment 130$a$ to network 140.

Similarly, processing environment 130$b$ includes processors 104$b$ and 106$b$, which comprise virtual machines 120$b$, 122$b$, 124$b$ and 126$b$ as shown. Memory 102$b$ is shared between processors 104$b$ and 106$b$ through bus interconnect 108$b$, which also connects to network interface 110$b$. Network interface 110$b$ interfaces with network 140 as shown.

Processors 104$a$, 106$a$, 104$b$ and 106$b$ may be implemented as any processor, including, by way of example, a general purpose processor, a digital signal processor (DSP), application specific integrated circuit (ASIC), a field programmable gate array (FPGA) or other programmable logic or processing entity. One or more of the processors 104$a$, 106$a$, 104$b$ and 106$b$ may be configured to run on an operating system and execute instructions related to particular instruction set architectures. One or more of the processors 104$a$, 106$a$, 104$b$ and 106$b$ may be a host processor to one or more virtual machines as shown in FIG. 1.

Implementation of the virtual machines 120$a$-126$a$ and 120$b$-126$b$ may be based on their desired use and degree of attachment to their corresponding host processors. For example, virtual machine 124$a$ may be programmed to run on an instruction set that is different from that of host processor 106$a$. Alternatively, or additionally, virtual machine 124$a$ may run an operating system or a dedicated program. By way of example, a Java virtual machine may be implemented to run the Java programming language on host processor 106$a$. Skilled persons will recognize various implementations of virtual machines as described herein.

Figure 2:
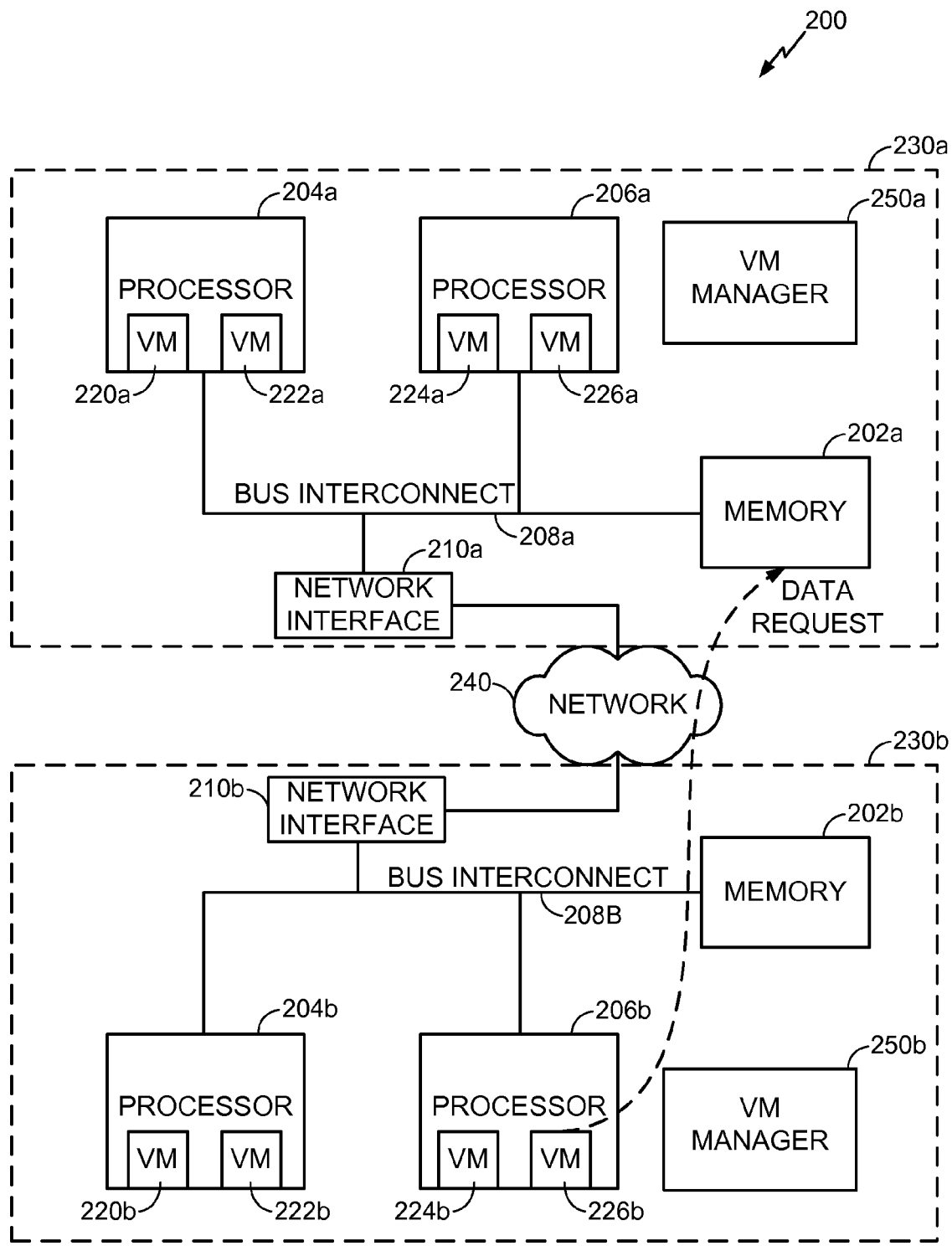
FIG. 2 is an illustration of multi-core processing system 200 according to an exemplary embodiment.

With reference now to FIG. 2, an exemplary embodiment is illustrated for system 200. System 200 illustrates virtual machine managers 250$a$ and 250$b$ used to control the operation of virtual machines in their host environments. Processors 204*a* and 206*a* are shown as implementing virtual machines 220*a*, 222*a*, 224*a* and 226*a*. Likewise, processors 204*b* and 206*b* are shown as implementing virtual machines 220*b*, 222*b*, 224*b* and 226*b*. It will be appreciated that virtual machine managers 250*a* and 250*b* may maintain communications with other virtual machine managers and/or the various processors implementing virtual machines in system 200. Virtual machine managers 250*a* and 250*b* may be used for enabling the provisioning of new virtual machines, allocating the required resources to the virtual machines, storing the state and operating parameters of individual virtual machines, and for transferring the location of an entire virtual machine or a part of a virtual machine to a new location within the same host processor or to a new host environment. Virtual machine managers 250*a* and 250*b* may be implemented in software and/or hardware and they may be dedicated to individual host processors or shared by one or more host environments. While virtual machine managers 250*a* and 250*b* have been illustrated as standalone units, this illustration should not be construed as limiting; they may be integrated within the same chip as one or more processing environments, or even within one or more host processors. Moreover, embodiments are not limited to requiring separate virtual machine managers in each processing environment as illustrated. For example, an embodiment may implement virtual machine manager 250*a* by integrating functionalities of virtual machine manager 250*b*, thus obviating a requirement for a separate instance of virtual machine manager 250*b*. Skilled persons will recognize suitable implementations of virtual machine managers 250*a* and/or 250*b*.

With continuing reference to FIG. 2, virtual machine 226*b*, which belongs to host processor 206*b* and processing environment 230*b* requests a data transfer from memory 202*a* which belongs to processing environment 230*a*. In order for this data transfer request to be satisfied, the request must make its way up from bus interconnect 208*b* to network interface 210*b* to network 240, and thereafter reach memory 202*a* through network interface 210*a* and bus interconnect 208*a*. In exemplary embodiments, a memory management unit (not shown) and/or a memory controller (also not shown) may control the data transfers to/from memory 202*a*. Virtual machine managers 250*a* and 250*b* may facilitate propagation of virtual machine 226*b*'s request to memory 202*a*.

Figure 3:
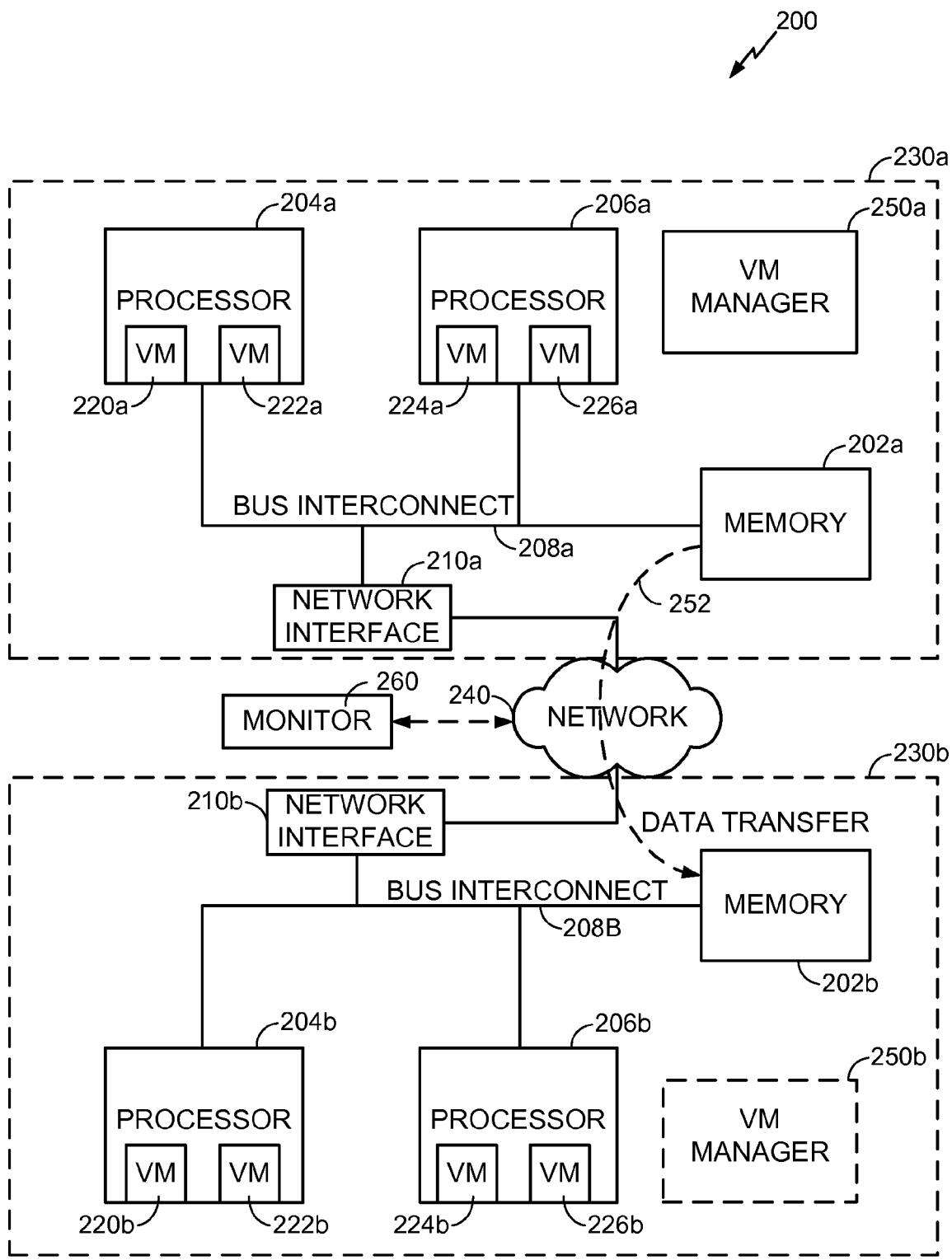
FIG. 3 is an illustration of a theoretical data transfer across processing environments of multi-core processing system 200.

FIG. 3 illustrates a theoretical path 252 for servicing the request if the requested data were to be transferred in order to service the request: the requested data would be transferred from memory 202*a* in processing environment 230*a* to memory 202*b* in processing environment 230*b*, and thereafter made available to virtual machine 226*b* over bus interconnect 208*b*. Conventionally, the minimum size of data that can be so transferred is the size of an entire page. This is because transferring the entire page facilitates memory coherency of distributed shared memory structures across multiple processing environments. Page sizes are conventionally 4 KB or larger, however, the various embodiments are not limited to any particular page size. Therefore memory 202*a* would transfer at least an entire page of size 4 KB in response to the request from virtual machine 226*b*.

As explained previously, such large data transfers adversely affect the bandwidth and system resources. Moreover, it is usually the case that a virtual machine such as virtual machine 226*b* makes frequent and numerous requests for data transfers back and forth from the same memory device during its operation, thereby exacerbating the problem.

Exemplary embodiments recognize that the state of entire host processors is often smaller than 4 KB. More particularly, the state of virtual machines can often be represented by 256 bytes. The embodiments also recognize that proximity to the memory device that virtual machines are requesting frequent data transfers from will reduce the pressure on system resources as the data will not have to travel very far.

Figure 4:
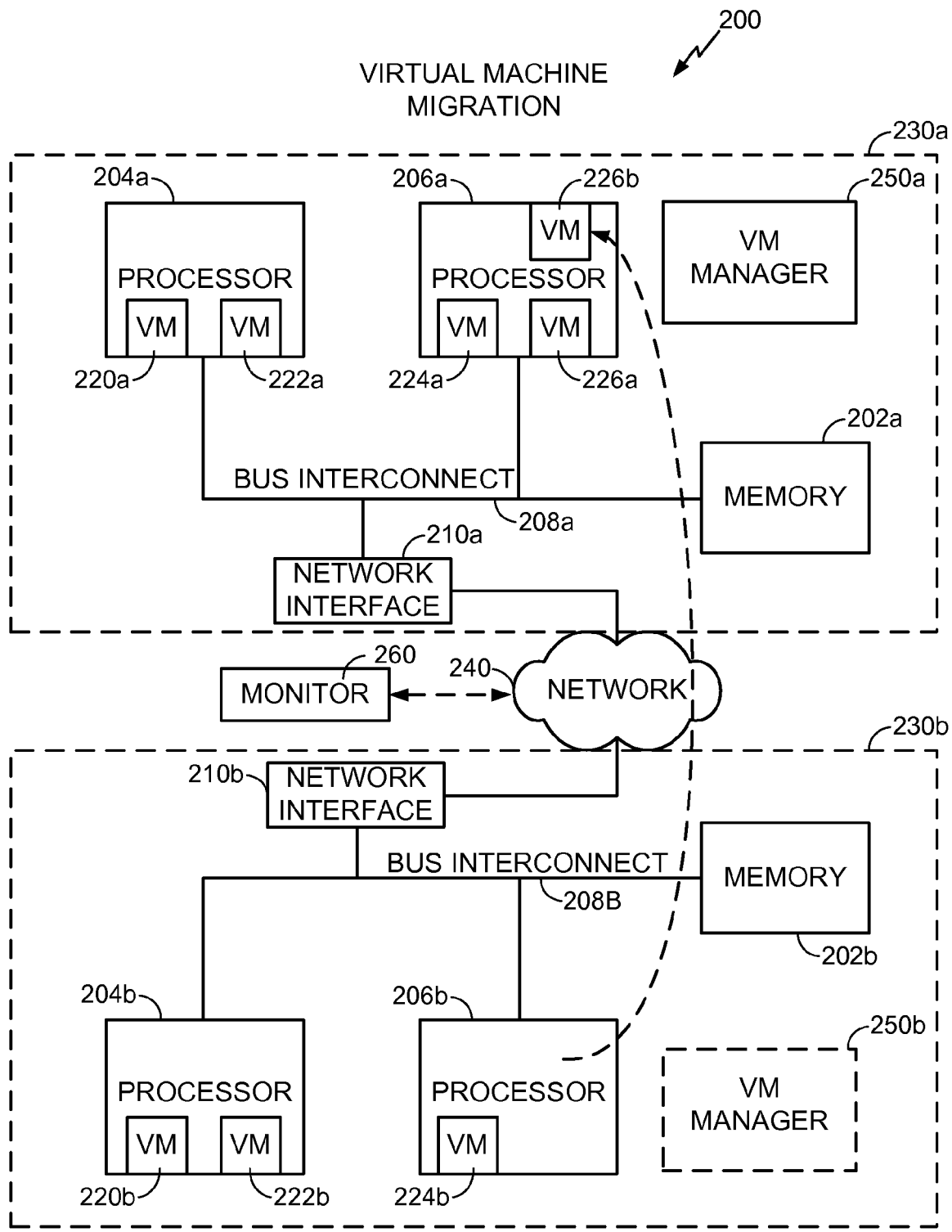
FIG. 4 is an illustration of virtual machine migration according to exemplary embodiments.

Accordingly, FIG. 4 illustrates an exemplary embodiment wherein, instead of transferring data along the theoretical path 252 illustrated in FIG. 3 to service the request from virtual machine 226*b*, the virtual machine 226*b* itself is migrated to host processor 206*a*. The migration may be performed under the control of virtual machine managers 250*a* and 250*b*. Moreover, instead of migrating virtual machine 226*b* as a whole, only a part of virtual machine 226*b* that requires frequent communication with memory 202*a* may be migrated. For example, virtual machines may abstract over communication mechanisms of a cluster of processors in a multi-core processing environment. Such virtual machines may comprise one or more processes associated with individual ones of one or more processors in the cluster. Referring back to FIG. 4, virtual machine 226*b* may comprise a particular process associated with host processor 206*a* requiring communication with memory 202*a*. In this case, only a part of virtual machine 226*b* running the particular process, as opposed to the entire virtual machine 226*b*, may be migrated to host processor 206*a*. In another example, a part of a virtual machine 226*b* which comprises integer registers may be transferred to host processor 206*a*, while all floating point or vector registers may not be transferred unless specifically needed.

Migration of virtual machine 226*b* to host processor 206*a* may allow virtual machine 226*b* to communicate with memory 202*a* through bus interconnect 208*a*, without having to go through bus interconnect 208*b*, network interfaces 210*a* and 210*b* and network 240. Smaller data transfer sizes may also be supported for data transfers between host processor 206*a* and memory 202*a* over bus interconnect 208*a* because maintaining memory coherency may be easier within processing environment 230*a*.

Accordingly, the requested data need not be transferred in minimum (e.g., 4 KB) page sized blocks, but may be appropriately sized in proportion to the size of data requested. Further, in scenarios wherein one or more host processors wish to share data of fine granularity, such as while competing for a lock or false sharing situations, virtual machines across different host processors can be transferred to a single host processor and cache/memory coherency problems may be avoided. It will also be appreciated that virtual machine migration may be used for accelerating memory coherency without requiring coherency bus structures or dedicated hardware support for coherency operations. These and other advantages of virtual machine migration will be recognized by those skilled in the art.

Further, as illustrated in FIGS. 3-4, exemplary embodiments may also include a memory request monitor 260 to monitor memory requests between processors. While monitor 260 has been illustrated as being in communication with network 240, various other implementations are included within the scope of the embodiments. For example, one or more memory request monitors may be integrated within one or more host processors. As another example, memory request monitors may be configured as a part of virtual machine managers such as 250*a* and 250*b*. Moreover, memory request monitors may also be implemented either partially or completely in software. It will be appreciated that various configurations of memory request monitor 260 may be implemented based on particular applications and system configurations.

In exemplary implementations, monitor 260 may monitor requests between one or more processors in one processing environment and memory associated with one or more processors in another processing environment. It may often be the case that such memory requests across processing environments may be associated with one or more virtual machines residing in the processors. A threshold number of data transfer requests between a processor (or virtual machine residing within the processor) and a memory element associated with a different processor may be determined. If a number of such memory requests exceed a predetermined threshold number, a virtual machine migration may be initiated. It will be understood that the predetermined threshold number may be "zero", i.e. detection of any access or data transfer request between a processor (or virtual machine residing within the processor) and a memory element associated with a different processor may be configured to trigger a virtual machine migration.

Another trigger mechanism may involve configuring the monitor 260 to distinguish between various types of memory requests, including requests for read-only data, requests for writable data, requests for different data sizes, and/or other attributes. Predetermined threshold numbers may be associated with each type of memory request, and virtual machine migration may be triggered if a number of memory requests of an individual type of memory requests exceeds an associated predetermined threshold number.

Exemplary embodiments may also utilize one or more virtual machine managers (e.g., 250a and 250b) to track a number of virtual machine migrations. The decision to migrate virtual machines may be based in part on the number of virtual machine migrations that have previously been performed. This decision to migrate virtual machines by virtual machine managers 250a and 250b may be made in conjunction with determinations of the number of memory requests from monitor 260.

Accordingly, exemplary embodiments advantageously migrate at least a part of virtual machines instead of transferring large blocks of data from shared memory structures across numerous interconnect and network means. Once it has been determined by virtual manager 250a or 250b or any other suitable monitoring means that the virtual machine is no longer required to remain in the host environment it was migrated to, a migrated virtual machine may be transferred back to the original host processor that was associated with the virtual machine, or to any new suitable host environment. Skilled persons will appreciate the advantages of migrating virtual machines or states of virtual machines in the manner described.

Figure 5:
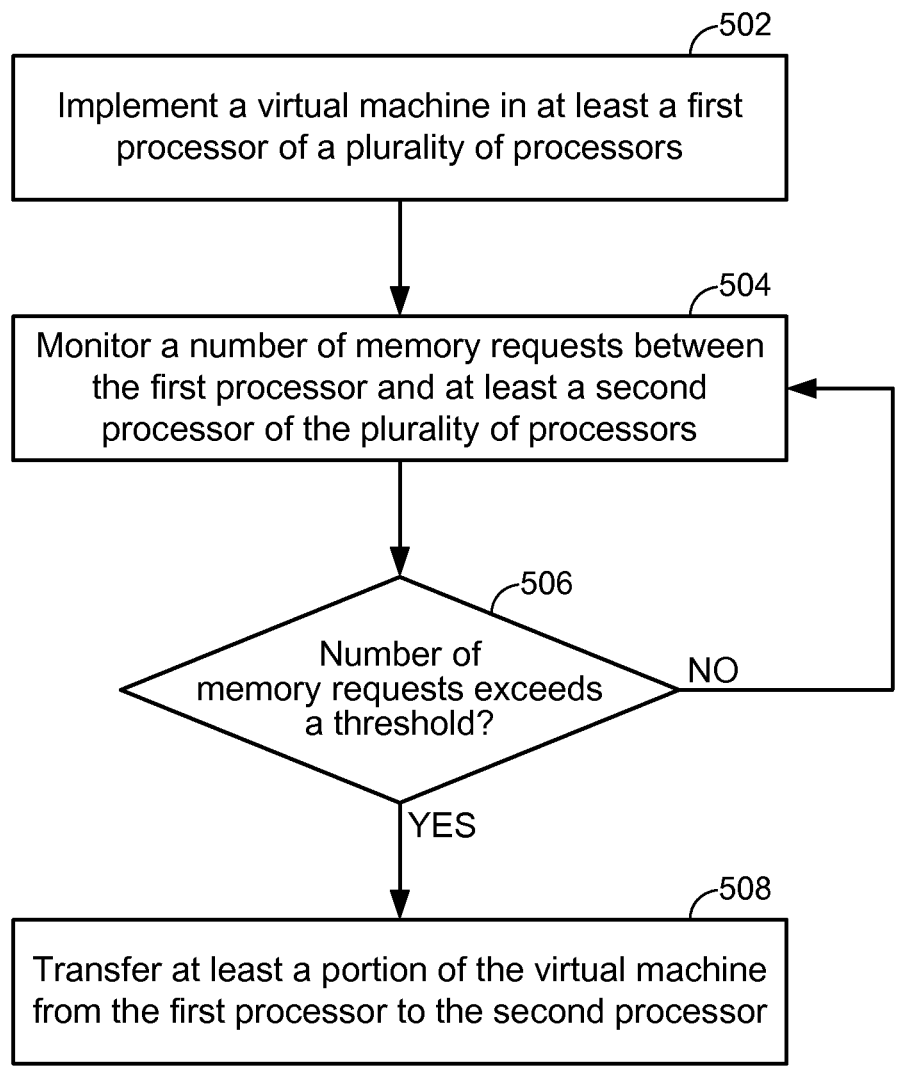
FIG. 5 is a flow chart illustrating a sequence of events associated with virtual machine migration in exemplary embodiments.

It will also be appreciated that embodiments include various methods for performing the processes, functions and/or algorithms disclosed herein. For example, as illustrated in FIG. 5, an embodiment can include a method of implementing a virtual machine in at least a first processor of a plurality of processors (Block 502). A number of memory requests can be monitored between the first processor and at least a second processor of the plurality of processors (Block 504). It can be determined if the number of memory requests exceeds a threshold (Block 506). If the threshold is exceeded, at least a portion of the virtual machine can be transferred from the first processor to the second processor (Block 508).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for virtual machine migration. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A system for virtual machine migration comprising:
   a plurality of processors;
   a first processor of the plurality of processors implementing at least one virtual machine, wherein the first processor is integrated into a first processing environment;
   a monitor configured to:
      monitor a number of memory requests over a shared system resource between the at least one virtual machine executing on the first processor and a memory associated with at least a second processor of the plurality of processors, wherein memory and the second processor are integrated into a second processing environment and the first and second processing environments are separated by the shared system resource; and
      determine that the number of memory requests exceeds a threshold; and
   a virtual machine manager configured to migrate at least a portion of the at least one virtual machine from the first processor to the second processor based on the number of memory requests exceeding a threshold such that after the migration occurs subsequent memory requests between the at least one virtual machine and the memory are contained within the second processing environment thereby reducing the number of memory requests over the shared system resource.

2. The system of claim 1, further comprising: an access interface between at least the first processor and the second processor, wherein the number of memory requests are monitored across the access interface.

3. The system of claim 2, wherein the access interface is a bus.

4. The system of claim 1, wherein the virtual machine manager is configured to migrate an entirety of the virtual machine.

5. The system of claim 1, wherein the virtual machine manager is configured to migrate only a portion of the virtual machine and state information associated with the virtual machine required for completing the memory requests.

6. The system of claim 1, wherein the virtual machine manager is configured to track a number of virtual machine migrations and determine a condition for a current virtual machine migration based on a number of previously executed virtual machine migrations.

7. The system of claim 1, further comprising:
a plurality of types of memory requests;
a plurality of thresholds associated with the plurality of types of memory requests;
the monitor comprising logic to monitor a number of memory requests between the first processor and at least the second processor for each type of the plurality of types of memory requests; and
the virtual machine manager comprising logic to migrate at least a portion of the virtual machine from the first processor to the second processor based on the number of memory requests of at least one of the types of memory requests exceeding an associated threshold.

8. A method of managing virtual machines in a multi-core processing environment comprising a plurality of processors, the method comprising:
implementing at least one virtual machine in a first processor of the plurality of processors, wherein the first processor is integrated into a first processing environment;
monitoring a number of memory requests over a shared system resource between the at least one virtual machine executing on the first processor and a memory associated with at least a second processor of the plurality of processors, wherein memory and the second processor are integrated into a second processing environment and the first and second processing environments are separated by the shared system resource;
determining that the number of memory requests exceeds a threshold; and
migrating at least a portion of the at least one virtual machine from the first processor to the second processor based on the number of memory requests exceeding a threshold such that after the migration occurs subsequent memory requests between the at least one virtual machine and the memory are contained within the second processing environment thereby reducing the number of memory requests over the shared system resource.

9. The method of claim 8, wherein an access interface is configured between the first processor and the second processor, and wherein the number of memory requests is monitored across the access interface.

10. The method of claim 9, wherein the access interface is a bus.

11. The method of claim 8, wherein an entirety of the virtual machine is migrated.

12. The method of claim 8, wherein only a portion of the virtual machine and associated state information are migrated.

13. The method of claim 8, further comprising determining a condition for a current virtual machine migration based on a number of previously executed virtual machine migrations.

14. The method of claim 8, further comprising:
determining a plurality of types of memory requests;
determining a plurality of thresholds associated with the plurality of types of memory request;
monitoring a number of memory requests between the first processor and at least the second processor for each of the plurality of types of memory requests; and
migrating at least a portion of the virtual machine from the first processor to the second processor based on the number of memory requests of at least one of the types of memory requests exceeding an associated threshold.

15. A system for managing virtual machines in a multi-core processing environment comprising a plurality of processors, the system comprising:
at least one virtual machine means implemented in a first processor of the plurality of processors, wherein the first processor is integrated into a first processing environment;
means for monitoring a number of memory requests over a shared system resource between the at least one virtual machine executing on the first processor and a memory associated with at least a second processor of the plurality of processors, wherein memory and the second processor are integrated into a second processing environment and the first and second processing environments are separated by the shared system resource;
means for determining that the number of memory requests exceeds a threshold; and
means for migrating at least a portion of the at least one virtual machine means from the first processor to the second processor based on the number of memory requests exceeding a threshold such that after the migration occurs subsequent memory requests between the at least one virtual machine and the memory are contained within the second processing environment thereby reducing the number of memory requests over the shared system resource.

16. The system of claim 15, wherein an interface means is configured between the first processor and the second processor, and wherein the number of memory requests is monitored across the interface means.

17. The system of claim 15, wherein an entirety of the virtual machine means is migrated.

18. The system of claim 15, wherein only a portion of the virtual machine means and associated state information are migrated.

19. The system of claim 15, further comprising means for migrating the virtual machine means based on a number of previously executed virtual machine means migrations.

20. The system of claim 15, further comprising:
a plurality of types of memory requests;
a plurality of thresholds associated with the plurality of types of memory request;
means for monitoring a number of memory requests between the first processor and at least the second processor for each of the plurality of types of memory requests; and
means for migrating at least a portion of the virtual machine means from the first processor to the second processor based on the number of memory requests of at least one of the types of memory requests exceeding an associated threshold.

21. A non-transitory computer-readable storage medium, comprising code, which when executed by a managing processor of a plurality of processors, causes migration of at least one virtual machine from a first processor to a second processor of the plurality of processors, wherein the non-transitory computer-readable storage medium comprises:
   code for monitoring a number of memory requests over a shared system resource between the at least one virtual machine executing on the first processor and a memory associated with the second processor, wherein the first processor is integrated into a first processing environment, the memory and the second processor are integrated into a second processing environment, and the first and second processing environments are separated by the shared system resource;
   code for determining that the number of memory requests exceeds a threshold; and
   code for migrating at least a portion of the virtual machine from the first processor to the second processor based on the number of memory requests exceeding a threshold such that after the migration occurs subsequent memory requests between the at least one virtual machine and the memory are contained within the second processing environment thereby reducing the number of memory requests over the shared system resource.

22. The non-transitory computer-readable storage medium of claim 21, wherein an access interface is configured between the first processor and the second processor.

23. The non-transitory computer-readable storage medium of claim 21, wherein an entirety of the virtual machine means is migrated.

24. The non-transitory computer-readable storage medium of claim 21, wherein only a portion of the virtual machine means and associated state information are migrated.

25. The non-transitory computer-readable storage medium of claim 21, further comprising code for migrating the virtual machine means based on a number of previously executed virtual machine means migrations.

26. The non-transitory computer-readable storage medium of claim 21, further comprising:
   a plurality of types of memory requests;
   a plurality of thresholds associated with the plurality of types of memory request;
   code for monitoring a number of memory requests between the first processor and at least the second processor for each of the plurality of types of memory requests; and
   code for migrating at least a portion of the virtual machine means from the first processor to the second processor based on the number of memory requests of at least one of the types of memory requests exceeding an associated threshold.

* * * * *